United States Patent
Wang

[19]

[11] Patent Number: 5,917,474

[45] Date of Patent: *Jun. 29, 1999

[54] FREE PIVOT-ARM KEY PLATE

[75] Inventor: Chi-Ming Wang, Taipei, Taiwan

[73] Assignee: Logitech, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,038

[22] Filed: Jan. 31, 1997

[51] Int. Cl.⁶ .................................................. G09G 5/08
[52] U.S. Cl. ........................................... 345/167; 345/156
[58] Field of Search .................................. 345/167, 163, 345/164, 165, 156, 157, 158, 162; 74/471 XY; 364/709.01

[56] References Cited

U.S. PATENT DOCUMENTS

| | | | |
|---|---|---|---|
| 5,235,868 | 8/1993 | Culver | 74/471 XY |
| 5,298,919 | 3/1994 | Chang | 345/163 |
| 5,565,891 | 10/1996 | Armstrong | 345/167 |
| 5,657,051 | 8/1997 | Liao | 345/163 |
| 5,712,725 | 1/1998 | Faltermeier et al. | 345/164 |
| 5,726,684 | 3/1998 | Blankenship et al. | 345/163 |

Primary Examiner—Chanh Nguyen
Assistant Examiner—John Suraci
Attorney, Agent, or Firm—Townsend and Townsen and Crew LLP

[57] ABSTRACT

The present invention relates to a trackball/actuator assembly for a portable computer that includes one or more free pivot-arm key plates disposed around a trackball module. According to one embodiment of the present invention, it includes a housing having a top surface and sidewalls extending downward from opposite ends of the top surface, a first keyplate protruding from the top surface between the sidewalls, a second keyplate protruding from the top surface between the sidewalls, and a trackball disposed between the keyplates. First and second pivot joints formed integral to the first and second sidewalls, respectively, form a first horizontal axis between the sidewalls that is offset from the first keyplate. The first keyplate is rotatably coupled to first and second pivot joints so that it pivots freely about the first horizontal axis. Third and fourth pivot joints formed integral to said first and second sidewalls, respectively, form a second horizontal axis between the sidewalls that is offset from the second keyplate. The second keyplate is rotatably coupled to third and fourth pivot joints so that it rotates freely about the second horizontal axis.

12 Claims, 5 Drawing Sheets

FREE PIVOT-ARM KEY PLATE

BACKGROUND OF THE INVENTION

The present invention relates generally to input devices for personal computers. More specifically, the present invention relates to a trackball-type input device for use with a portable personal computer.

For user input, the conventional portable computer typically includes an alphanumeric keyboard and some type of pointing/selecting device. One type of pointing/selecting device commonly used with portable computers is a trackball-type device. This type of device generally includes a trackball for controlling the movement of a cursor on the display screen and one or more actuator switches for selecting items highlighted by the cursor.

For portable computers, the designs for trackball-type devices fall generally into one of two categories: External or integral. External designs provide a trackball/actuator assembly that is separately housed and which attaches to the portable computer housing via a cable or specially-designed hardware. An integral design includes a trackball and one or more actuator switches which are integral to the computer housing. Typically, the trackball and actuator(s) are placed in the middle of the computer housing below the "SPACE" key of the alphanumeric keyboard. Examples of integral designs include designs by Toshiba Electronics Corporation, by AST Research Corporation, and by Compaq Computer Corporation, among others.

Although external designs allow for maximum use of limited computer-housing space for the keyboard layout, integral designs are often preferred because they provide a portable computer that is completely self-contained and easy to transport (i.e., no disassembly and/or separate storage is required for the trackball/actuator assembly to transport the portable computer). However, as will be described below, integral designs bring to the forefront the conflict between performance criteria for trackball-type devices and the severe size/space limitations generally associated with a portable computer.

The computer industry has adopted certain performance criteria for various input devices including trackball-type devices for use in portable computers. Among them are that 1) the input device should be easily accessible or usable by both left- and right-handed users; 2) the user-operated components should be large enough so that a user can easily locate and operate them by "feel" (i.e., the user does not have to visually locate the components each time to operate them); 3) the pressure required to activate an actuator switch should be appropriate: not so much as to cause excess strain on the typical user, and not so little as to result in frequent accidental activation; and 4) the design should be durable enough so that the device can be operated frequently without failure over the useful life of the portable computer.

At odds with these criteria is the reality that there are severe size/space limitations associated with portable computers. Market forces place the industry under increasing pressure to provide more capability and peripherals in a more compact and lightweight case. Hence, computer housing space, both inside and out, is at a premium. Also, many portable computer manufacturers aspire to provide a keyboard layout which is comfortable for the typical user and which emulates the conventional multi-function keyboard layout commonly used with desktop computers. This last consideration, in combination with the first, severely limits the amount of surface area remaining to implement the desired trackball and actuator switch(es).

Most conventional integral designs deal with the foregoing conflict in a highly sub-optimal manner. For example, referring to FIG. 1, there is shown a conventional integral trackball/actuator assembly 10 for a portable computer. The conventional actuator switch 12 for a portable computer consist of a keyplate 14 placed above a microswitch 16. The keyplate 14 is attached to one end of a length of flexible material 18 whose other end is fixed to the underside of the top surface of the computer housing 20 by, for example, a thermoweld or coldweld 22. In this arrangement, the length of flexible material 18 acts as a lever arm for the keyplate 14 and shares the stress produced when the user presses the keyplate. Consequently, the durability of the actuator switch 12 is in part a function of the length of the flexible material 18: the longer the material, the more durable the actuator switch.

To produce thermoweld or coldweld 22, a separate step in the manufacturing process for the input device is typically required. This adds cost and time to the manufacturing process for the device. In addition, additional surface area is required to produce a welding joint that is substantial enough to withstand frequent activation by a user.

To provide good performance, the conventional actuator switch should include a) a keyplate which is large enough to enable the user to locate it by "feel", and b) a length of flexible material, and a thermoweld joint which are sufficient to provide the desired durability. It should now be appreciated that implementing each of these features requires a considerable amount of surface area. However, in view of the size and space considerations outlined above, the required surface area is often not available. Consequently, compromises in the size of the keyplate 14, the length of the flexible material 18, and/or the size of the thermoweld joint are often made resulting in degraded performance. What is needed, therefore, is a trackball/actuator design which provides good performance in a very small space.

SUMMARY OF THE INVENTION

The present invention relates to a trackball/actuator assembly for a portable computer that includes one or more free pivot-arm key plates disposed around a trackball module. According to one embodiment of the present invention, it includes a housing having a top surface and sidewalls extending downward from opposite ends of the top surface, a first keyplate protruding from the top surface between the sidewalls, a second keyplate protruding from the top surface between the sidewalls, and a trackball disposed between the keyplates. First and second pivot joints formed integral to the first and second sidewalls, respectively, form a first horizontal axis between the sidewalls that is offset from the first keyplate. The first keyplate is rotatably coupled to first and second pivot joints so that it pivots freely about the first horizontal axis. Third and fourth pivot joints formed integral to said first and second sidewalls, respectively, form a second horizontal axis between the sidewalls that is offset from the second keyplate. The second keyplate is rotatably coupled to third and fourth pivot joints so that it rotates freely about the second horizontal axis.

According to another embodiment, the first keyplate includes first and second extension members extending from opposite ends of the keyplate to the first and second pivot joints, respectively. Likewise, the second keyplate includes third and fourth extension members extending from opposite ends of said second keyplate to the third and fourth pivot joints, respectively. In the preferred embodiment, the first and second extension members overlap the third and fourth extension members.

The present invention overcomes the limitations of the prior art in that it produces very good performance in a very limited space and requires a reduced amount of surface area for its implementation.

DESCRIPTION OF THE PREFERRED EMBODIMENT

Figure 1:
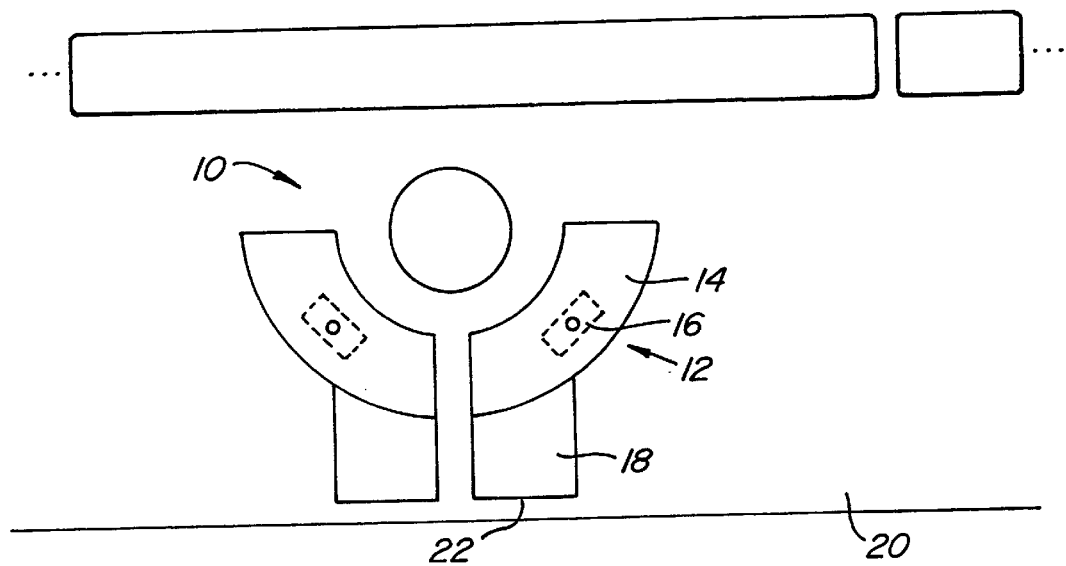
FIG. 1 is a drawing of a conventional trackball/actuator assembly according to the prior art.
Figure 2:
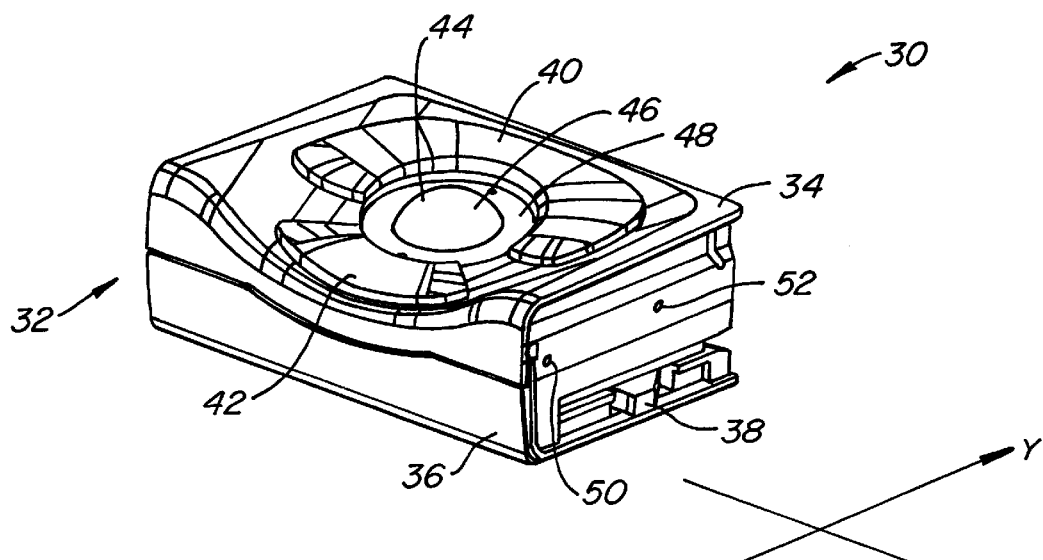
FIG. 2 is a perspective view of the trackball/actuator assembly according to the present invention.

FIG. 2 is a perspective drawing of the trackball/actuator assembly 30 according to the present invention. It includes a housing 32 having a upper portion 34 and a lower portion 36. The assembly 30 is designed to be slidably engaged with a portable computer housing (not shown) so that it is effectively integral to the computer housing. A locking spring 38 extending from a side wall of the lower portion 36 of the housing prevents the trackball/actuator assembly 30 from being inadvertently disengaged from the computer housing during use.

Protruding from the upper portion 34 of housing 32 are a large key plate 40, a small key plate 42, and a trackball assembly 44. Trackball assembly 44 includes a trackball 46 and a retaining ring 48. As shall be described more fully below, large key plate 40, and small key plate 42 are pivotally coupled to the upper portion 34 of housing 32 via pivot points 50 and 52, respectively. In the figure, pivots points 50 and 52 are shown integral to the side walls of upper portion 34. However, it should be appreciated by one of ordinary skill that pivot points 50 and 52 may be implemented separate from or without the sidewalls in separate pivot supporting members.

Figure 3:
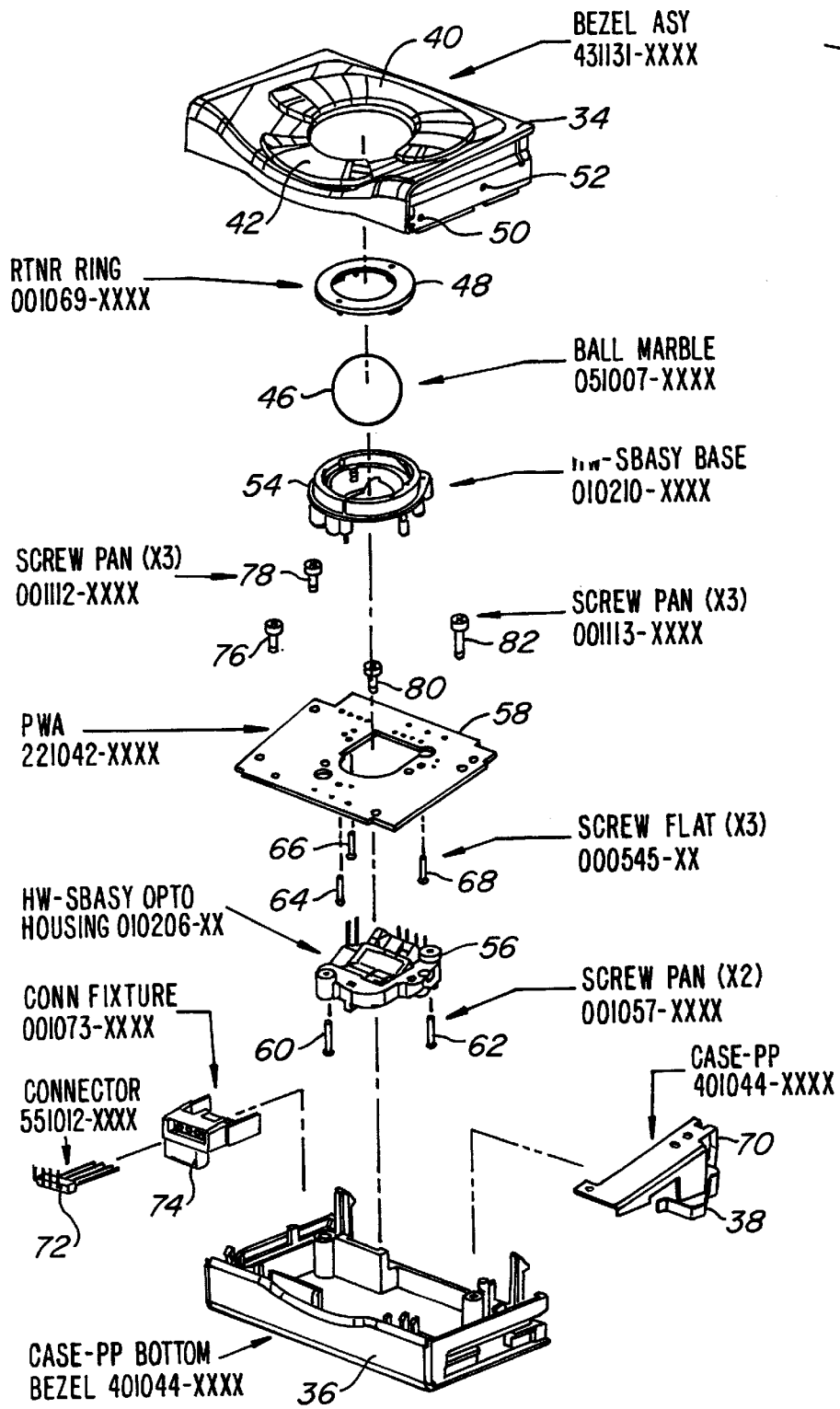
FIG. 3 is an exploded perspective view of the trackball/actuator assembly according to the present invention.

FIG. 3 is an exploded perspective view of the trackball/actuator assembly according to the present invention. Items which are identical to those shown in FIG. 2 are identically numbered. The upper portion 34 of the housing, including the large key plate 40 and the small key plate 42, is shown at the top of the figure. Trackball assembly 44 includes retaining ring 48 and trackball 46. In addition, trackball assembly 44 includes a trackball base 54 and an opto subassembly 56. Opto subassembly 56 includes the detectors/transducers (not shown) for converting the motion of trackball 46 into X-Y translation signals.

Trackball base 54 is mounted to the topside of printed wire assembly (PWA) 58 which is described more fully below. Opto subassembly 56 is secured to trackball base 54. Securing opto subassembly 56 to trackball base 54 rather than to the underside of PWA 58 reduces the optical path tolerance variation by reducing the number of contacting components. So, the optical path excludes the PWA tolerance during assembly. Trackball base 54 is secured to PWA 58 by screws 64, 66 and 68, and opto subassembly 56 is secured to trackball base 54 by screws 60 and 62.

A ground plate 70 is mounted to the top of PWA 58 and a connector assembly, including connector 72 and a connector guard 74, is mounted to the underside of PWA 58. The locking spring 38 is integral to ground plate 70. PWA 58 is secured to the bottom portion 32 of the housing by screws 76, 78, 80 and 82. Screw 82 also secures and provides an electrical connection for ground plate 70 to PWA 58.

Figure 4:
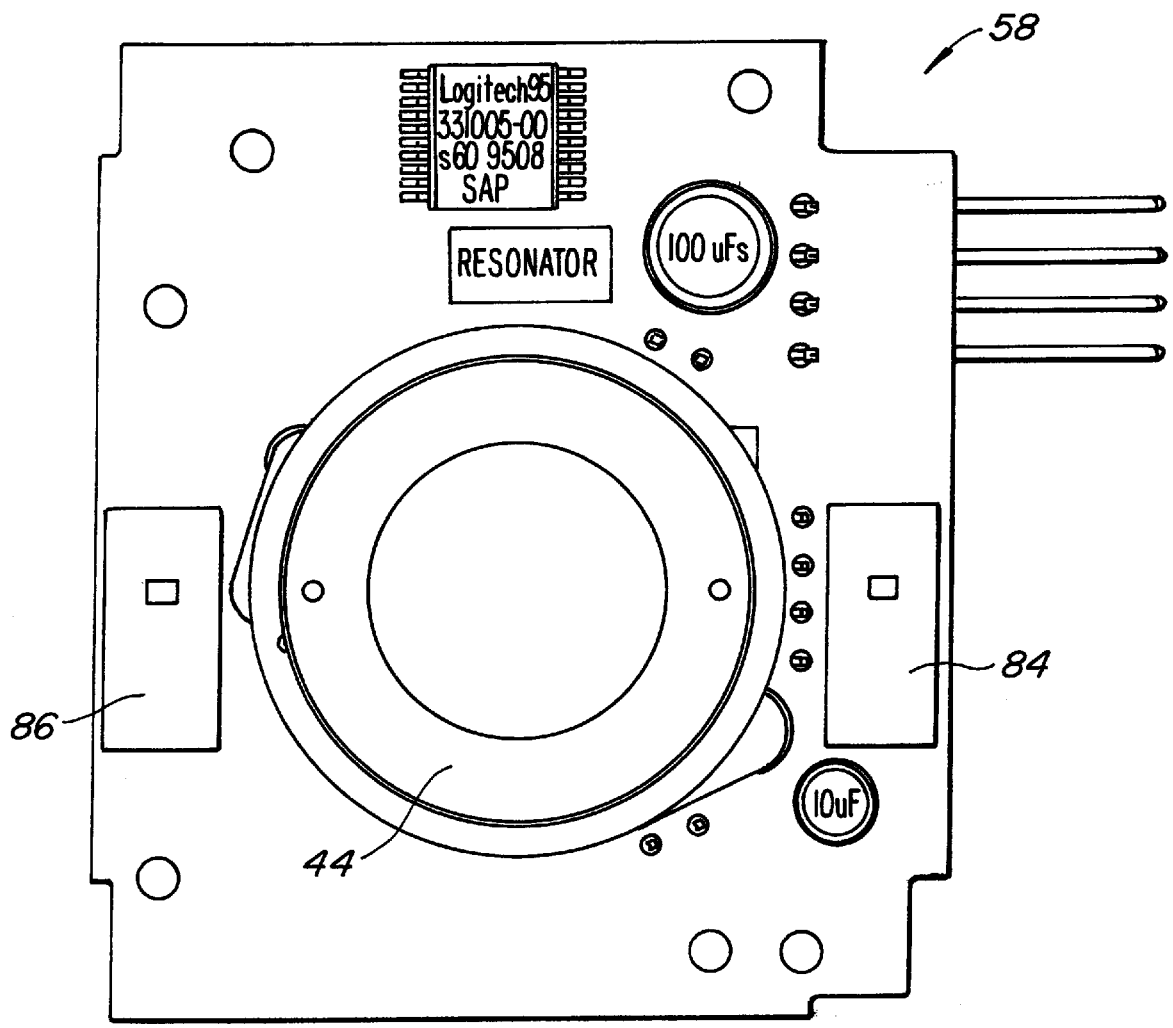
FIG. 4 is a drawing of a printed wire assembly (PWA) according to the present invention, including a trackball assembly and other electronic component mounted thereon.

FIG. 4 is a drawing of PWA 58 according to the present invention, including the trackball assembly 44 and other electronic components being mounted thereon. Among the electronic components shown are a first microswitch 84 and a second microswitch 86 which are both mounted on the topside of PWA 58. As shall be described more fully below, first microswitch 84 is mounted on one side of trackball assembly 44 to be engaged by large key plate 40, and second microswitch 86 is mounted on the opposite side of trackball assembly 44 to be engaged by small key plate 42.

Figure 5:
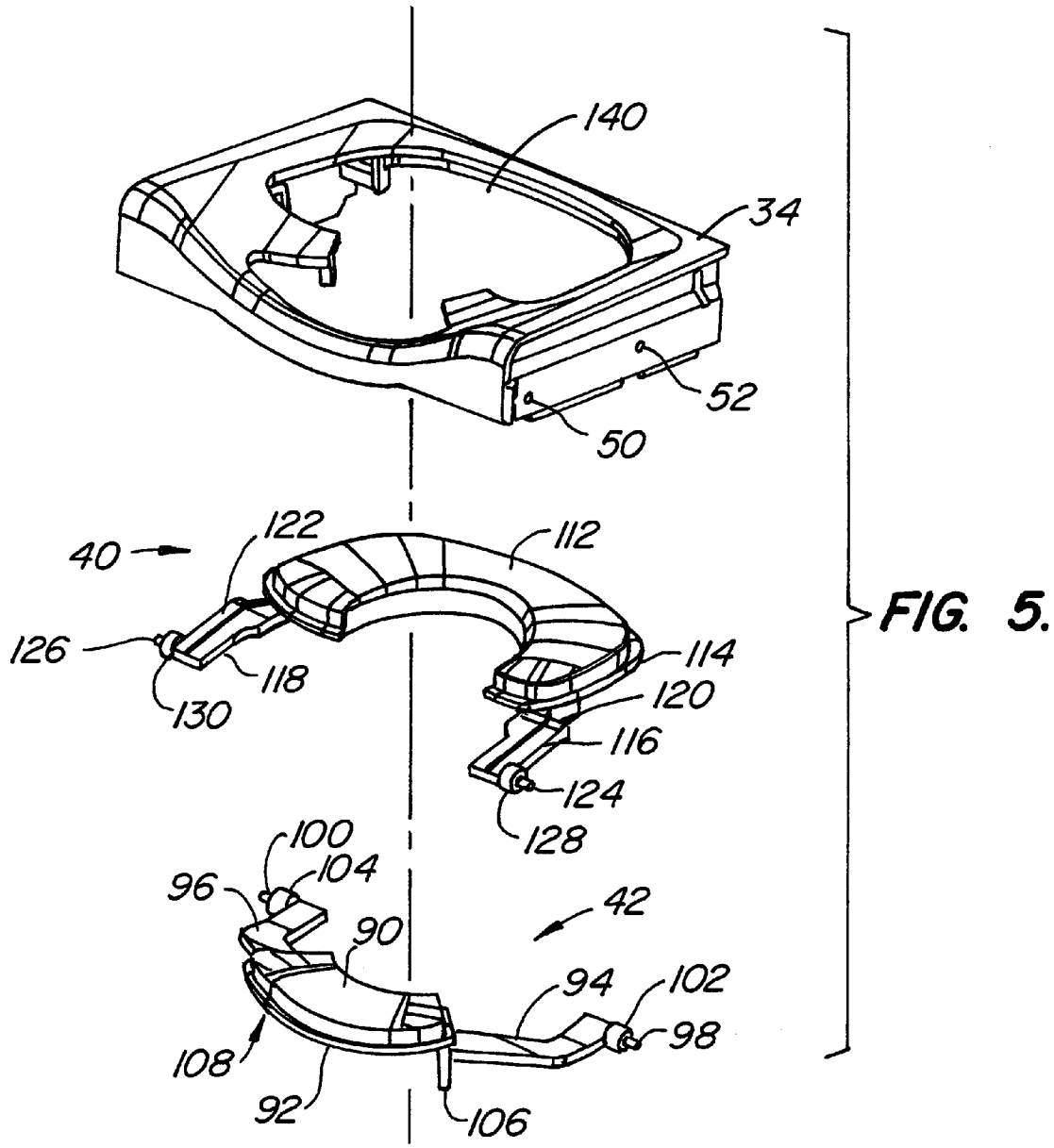
FIG. 5 is an exploded perspective view of an upper portion of the housing of the trackball/actuator assembly according to the present invention.

FIG. 5 is an exploded view of the upper portion 34 of housing 32 including the large key plate 40 and the small key plate 42. In the preferred embodiment, all of the components shown are made of a durable, lightweight, moldable material such as ABS plastic, however, other materials having the same characteristics could also be reasonably and suitably employed. The details of the upper portion 34 of housing 32X shall now be described.

Small key plate 42 includes an elongated finger engaging surface 90 which is surrounded by a lip 92. The elongated finger-engaging surface 90 is shaped to receive trackball assembly 44. A first lever arm 94 and a second lever arm 96 are formed integral to the underside of the elongated finger-engaging surface. The lever arms 94 and 96 extend outward and then forward from opposite ends of the elongated finger-engaging surface 90. Pivot pins 98 and 100, including stops 102 and 104, are formed integral to an outside portion of a distal end of lever arms 94 and 96. Pivot pins 98 and 100 are sized to fit into pivot joint 52 (and its counterpart on the opposite side of the top portion 34 of housing 32). Stops 102 and 104 keep the small key plate 42 from sliding from side to side when pivotally mounted in pivot joint 52 (and its counterpart). Protective bosses 106 and 108 are formed integral to the underside of the elongated finger-engaging region to protect the small key plate 42 from abnormal use. Switch-engaging boss (not shown) is formed integral to the underside of elongated finger-engaging surface 90.

Large key plate 40 also includes an elongated finger engaging surface 112 which is surrounded by a lip 114. Elongated finger-engaging surface 112 is shaped to receive trackball assembly 44. Lever arms 116 and 118 are formed integral to an underside of the elongated finger-engaging surface. Lever arms 116 and 118 extend forward from opposite ends of the elongated finger-engaging surface 112. In the preferred embodiment, lever arms 116 and 118 also include ribs 120 and 122, respectively, for added strength. Pivot pins 124 and 126, including stops 128 and 130, are formed integral to an outside portion of a distal end of lever arms 116 and 118. Pivot pins 124 and 126 are sized to fit into pivot joint 50 (and its counterpart on the opposite side of the top portion 34 of housing 32). Stops 128 and 130 keep large key plate 40 from sliding from side to side when pivotally mounted in pivot joint 50 (and its counterpart). Protective bosses (not shown) are formed integral to the underside of the elongated finger-engaging region to protect the large key plate 40 from abnormal use. Switch-engaging boss (not shown) is formed integral to the underside of elongated finger-engaging surface 112.

The upper portion 34 of the housing includes an opening 140 formed to receive the finger-engaging surface 112 of large key plate 40, the finger-engaging surface 90 of small key plate 42, and the trackball 46 and retaining ring 48 of trackball assembly 44. Pivot joints 50 and 52 (and their counterparts on the opposite side) are formed integral to the sidewalls of upper portion 34 of the housing. When large key plate 40 and small key plate 42 are pivotally mounted to the upper portion 34 of the housing, lips 114 and 92 limit the upward movement of large key plate 40 and small key plate 42, respectively. Otherwise, large key plate 40 rotates freely about an axis formed by pivot joint 50 and its counterpart, and small key plate 42 rotates freely about an axis formed by pivot joint 52 and its counterpart. Lips 114 and 92 also provide the cosmetic function of keeping users from being able to see PWA 58 through the top of housing 34 when the key plates 40 and 42 are installed.

Figure 6:
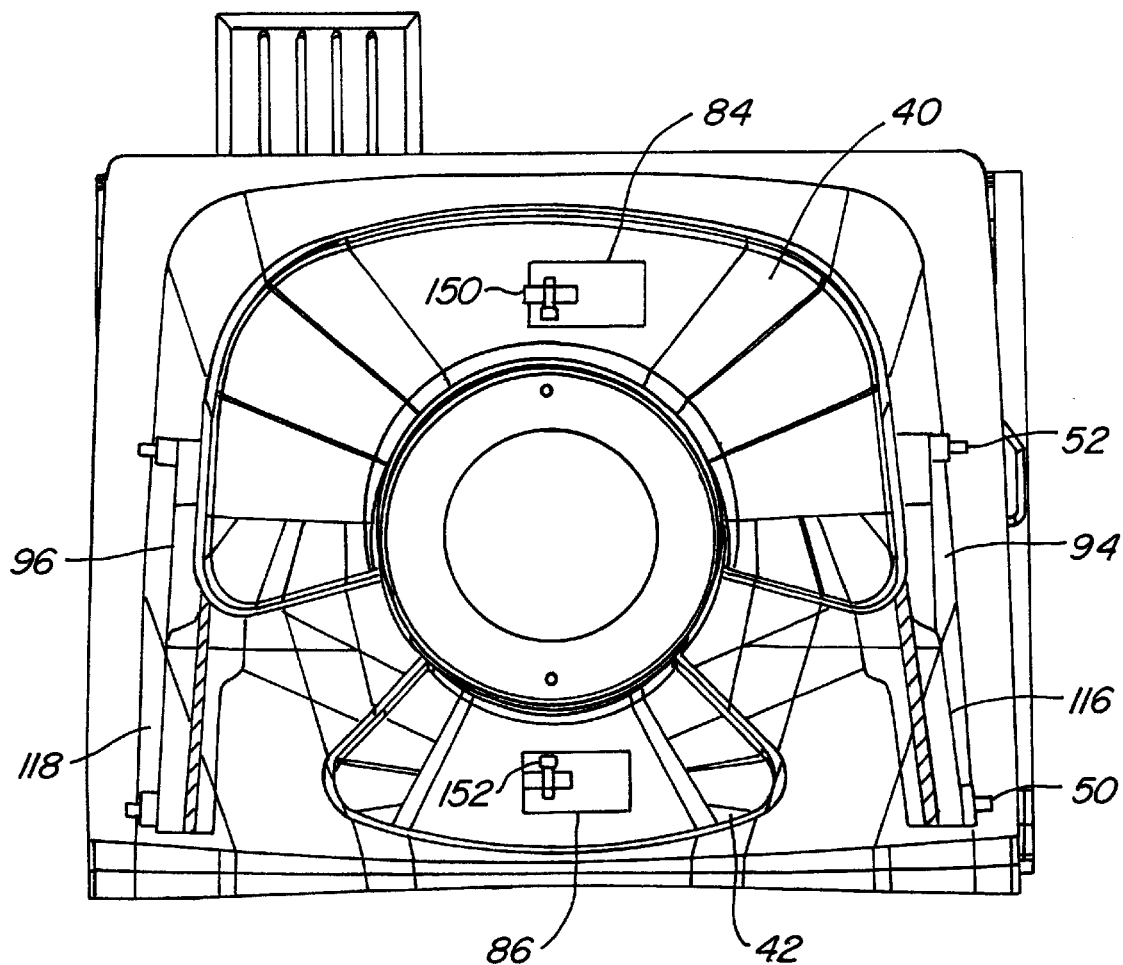
FIG. 6 is a top view of the trackball/actuator assembly according to the present invention.

FIG. 6 is a top view of the trackball/actuator assembly according to the present invention. The large key plate 40 is pivotally mounted in pivot joint 50 and the small key plate is pivotally mounted in pivot joint 52. The finger-engaging surfaces of large key plate 40 and small key plate 42 are shaped to form an opening for trackball 46 and retaining ring 48 of the trackball assembly 44.

The lever arms 116 and 118 of large key plate 40 overlap the lever arms 94 and 96 of small key plate 42 as shown. This configuration provides optimum performance—the long lever arms provide the required key plate durability and enhance key plate sensitivity—while also preserving space. In addition, in this configuration, lever arms 94 and 96 of small key plate 42 act as a safety constraint for large key plate 40. The location of pivot joints 50 and 52 and the shape of lever arms 116 and 118 and lever arms 94 and 96 are such that, during normal operation, lever arms 116 and 118 of large key plate 40 and lever arms 94 and 96 of small key plate 42 do not interfere.

Microswitch 84 is disposed under the elongated finger-engaging surface of large key plate 40 so that the switch-engaging boss 150 of large key plate 40 rests on microswitch 84. When pressed, the switch-engaging boss 150 of large key plate 40 activates microswitch 84. Microswitch 86 is similarly disposed under the elongated finger-engaging surface of small key plate 42 and is activated in a similar manner by the switch-engaging boss 152 of small key plate 42.

In conclusion, the present invention provides a trackball/actuator assembly for a portable computer which provides optimum performance in a very small space a requiring limited surface area. While the above is a complete description of the preferred embodiments of the invention, it should be apparent to one of ordinary skill in the art that various alternatives, modifications and equivalents may be used without departing from the invention. Therefore, the above description should not be taken as limiting the scope of the invention which is defined by the appended claims.

What is claimed is:

1. An input device for a computer comprising:
   a housing including a top surface and first and second sidewalls extending downward from opposite ends of said top surface;
   a first keyplate protruding from said top surface between said first and second sidewalls;
   a trackball having a portion thereof protruding from said top surface, said trackball being disposed adjacent to said first keyplate wherein said first keyplate, extends over a portion of a top of said trackball;
   first and second pivot joints formed integral to said first and second sidewalls, respectively, wherein said first and second pivot joints form a first horizontal axis between said sidewalls that is offset from said first keyplate;
   first and second extension members extending from opposite ends of said first keyplate to said first and second pivot joints, respectively; and
   a first switch coupled to said first keyplate,
   wherein said first keyplate is rotatably coupled to said first and second pivot joints so that said first keyplate pivots freely about said first horizontal axis, and wherein said first switch responds to a predetermined amount of movement in said first keyplate.

2. The input device of claim 1 further comprising:
   a first switch-supporting member coupled to said housing between said sidewalls and below said top surface,
   wherein said first switch is mounted on said first switch-supporting member so that said first switch is disposed to be activated when said first keyplate is pressed.

3. An input device for a computer comprising:
   a housing including a top surface and first and second sidewalls extending downward from opposite ends of said top surface;
   a first keyplate protruding from said top surface between said first and second sidewalls;
   a second keyplate protruding from said top surface between said first and second sidewalls, said second keyplate being opposite said first keyplate;
   a trackball having a portion thereof protruding from said top surface, said trackball being disposed between said first keyplate and said second keyplate;
   first and second pivot joints formed integral to said first and second sidewalls, respectively, wherein said first and second pivot joints form a first horizontal axis between said sidewalls that is offset from said first keyplate;
   third and fourth pivot joints formed integral to said first and second sidewalls, respectively, wherein said third and fourth pivot joints form a second horizontal axis between said sidewalls that is offset from said second keyplate;
   wherein said first keyplate is rotatably coupled to said first and second pivot joints so that said first keyplate pivots freely about said first horizontal axis;
   wherein said second keyplate is rotatably coupled to said third and fourth pivot joints so that said second keyplate pivots freely about said second horizontal axis;
   wherein said first keyplate is elongated and comprises first and second extension members extending from opposite ends of said first keyplate to said first and second pivot joints, respectively; and
   wherein said second keyplate is elongated and comprises third and fourth extension members extending from opposite ends of said second keyplate to said third and fourth pivot joints, respectively.

4. The input device of claim 3, wherein said first and second extension members overlap said third and fourth extension members.

5. The input device of claim 3, wherein said first and second extension members include first and second pivot pins coupled to a distal end of said first and second extension members, respectively, said first and second pivot pins projecting outward from said first and second extension members, respectively, into a first and second pin-receiving hole formed in said first and second sidewalls, respectively; and wherein said third and fourth extension members include third and fourth pivot pins coupled to a distal end of said third and fourth extension members, respectively, said third and fourth pivot pins projecting outward from said third and fourth extension members, respectively, into a third and fourth pin-receiving hole formed in said first and second sidewalls, respectively.

6. An input device for a computer comprising:

a housing including a top surface having a substantially rectangular shape and first and second sidewalls extending downward from opposite ends of said top surface;

a first keyplate having substantially a "U" shape, said first keyplate including a first elongated finger-engaging surface forming a base of said "U" shape, and first and second extension members forming legs of said "U" shape;

a movement sensing object having a portion thereof protruding from said top surface of said housing, wherein said first keyplate extends over a portion of a top of said movement sensing object, wherein the ends of said first and second extension members are rotatably coupled to said first and second sidewalls, respectively, such that said first elongated finger-engaging surface rotates about a first horizontal axis formed between ends of said first and second extension members, and wherein said top surface of said housing includes a first opening shaped to receive said first elongated finger-engaging surface;

a first switch supporting surface coupled to said housing so that said first switch supporting surface is under and substantially parallel to said top surface of said housing; and a first switch mounted on said first switch supporting surface and disposed under said first elongated finger-engaging surface of said first keyplate.

7. An input device for a computer comprising:

a housing including a top surface having a substantially rectangular shape and first and second sidewalls extending downward from opposite ends of said top surface;

a first keyplate having substantially a "U" shape, said first keyplate including a first elongated finger-engaging surface forming a base of said "U" shape, and first and second extension members forming legs of said "U" shape;

wherein the ends of said first and second extension members are rotatable coupled to said first and second sidewalls, respectively, such that said first elongated finger-engaging surface rotates about a first horizontal axis formed between ends of said first and second extension members; and wherein said top surface of said housing includes a first opening shaped to receive said first elongated finger-engaging surface;

a first switch supporting surface coupled to said housing so that said first switch supporting surface is under and substantially parallel to said top surface of said housing;

a first switch mounted on said first switch supporting surface and disposed under said first elongated finger-engaging surface of said first keyplate;

a second keyplate having substantially a "U" shape, said second keyplate including a second elongated finger-engaging surface forming a base of said "U" shape, and third and fourth extension members forming the legs of said "U" shape;

wherein the ends of said third and fourth extension members are rotatably coupled to said first and second sidewalls, respectively, such that said second elongated finger-engaging surface rotates about a second horizontal axis formed between the ends of said third and fourth extension members; and wherein said top surface of said housing includes a second opening shaped to receive said second elongated finger-engaging surface;

a second switch supporting surface coupled to said housing so that said second switch supporting surface is under and substantially parallel to said top surface of said housing; and a second switch mounted on said second switch supporting surface and disposed under said second elongated finger-engaging surface of said second keyplate.

8. The input device of claim 7, further comprising:

a trackball-supporting surface coupled to said housing between said first and second sidewalls so that said trackball-supporting surface is below and substantially parallel to said top surface of said housing;

a trackball assembly mounted on said trackball-supporting surface, said trackball assembly including a trackball; and wherein said trackball assembly is mounted so that a portion of said trackball protrudes from said top surface of said housing and is disposed between said first elongated finger-engaging surface of said first keyplate and said second elongated finger-engaging surface of said second keyplate.

9. The input device of claim 7, wherein said first opening and said second opening are opposite one another; and wherein said first and second extension members overlap said third and fourth extension members.

10. An input device for a computer comprising:

a housing including a top surface and a bottom surface coupled together to form a cavity therebetween;

a first keyplate protruding from said top surface;

a trackball supported by said bottom surface so that a portion thereof protrudes from said top surface and is adjacent to said first keyplate wherein said first keyplate, extends over a portion of a top of said trackball;

first and second pivot joints extending downward from opposite sides of said top surface, said first and second pivot joints forming a first horizontal axis that is offset from said first keyplate, and that is substantially perpendicular to an axis bisecting said first keyplate and said trackball;

first and second extension members extending from opposite ends of said first keyplate to said first and second pivot joints, respectively; and a first switch coupled to said first keyplate, wherein said first keyplate is rotatably coupled to said first and second pivot joints so that said first keyplate pivots freely about said first horizontal axis, and wherein said first switch responds to a predetermined amount of movement in said first keyplate.

11. An input device for a computer comprising:

a housing including a top surface and first and second sidewalls extending downward from opposite ends of said top surface;

a first keyplate protruding from said top surface between said first and second sidewalls;

a trackball having a portion thereof protruding from said top surface, said trackball being disposed adjacent to said first keyplate, wherein said first keyplate extends over a portion of a top of said trackball;

first and second pivot joints formed integral to said first and second sidewalls, respectively, wherein said first and second pivot joints form a first horizontal axis between said sidewalls that is offset from said first keyplate; and a first switch coupled to said first keyplate, wherein said first keyplate is rotatably coupled to said first and second pivot joints so that said first keyplate pivots freely about said first horizontal axis, and wherein said first switch responds to a predetermined amount of movement in said first keyplate.

12. An input device for a computer comprising:

a housing including a top surface and a bottom surface coupled together to form a cavity therebetween;

a first keyplate protruding from said top surface;

a trackball supported by said bottom surface so that a portion thereof protrudes from said top surface and is adjacent to said first keyplate, wherein said first keyplate extends over a portion of a top of said trackball;

first and second pivot joints extending downward from opposite sides of said top surface, said first and second pivot joints forming a first horizontal axis that is offset from said first keyplate, and that is substantially perpendicular to an axis bisecting said first keyplate and said trackball; and a first switch coupled to said first keyplate, wherein said first keyplate is rotatably coupled to said first and second pivot joints so that said first keyplate pivots freely about said first horizontal axis, and wherein said first switch responds to a predetermined amount of movement in said first keyplate.

\* \* \* \* \*